(12) United States Patent
Piehler

(10) Patent No.: US 10,809,540 B2
(45) Date of Patent: Oct. 20, 2020

(54) PROJECTOR HAVING AT LEAST FOUR PROJECTION LIGHT SOURCES AND A BEAM SPLITTER DEVICE COMPRISING A POLARIZATION BEAM SPLITTER AND PROJECTION OPTICS HAVING A BEAM SPLITTER DEVICE

(71) Applicant: Jabil Optics Germany GmbH, Jena (DE)

(72) Inventor: Eberhard Piehler, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 0 days.

(21) Appl. No.: 15/827,756

(22) Filed: Nov. 30, 2017

(65) Prior Publication Data

US 2018/0091785 A1  Mar. 29, 2018

Related U.S. Application Data

(63) Continuation of application No. 15/088,755, filed on Apr. 1, 2016, now Pat. No. 9,860,498.

(30) Foreign Application Priority Data

Apr. 2, 2015  (DE) .................. 10 2015 105 107

(51) Int. Cl.
| | | |
|---|---|---|
| *G02B 27/14* | (2006.01) | |
| *G02B 27/28* | (2006.01) | |
| *H04N 9/31* | (2006.01) | |
| *G02F 1/1335* | (2006.01) | |
| *H04N 5/74* | (2006.01) | |

(52) U.S. Cl.
CPC ......... *G02B 27/149* (2013.01); *G02B 27/141* (2013.01); *G02B 27/283* (2013.01); *H04N 9/3164* (2013.01); *G02F 2001/13355* (2013.01); *H04N 5/7416* (2013.01)

(58) Field of Classification Search
CPC ........ G02F 2001/13355; G02B 27/149; H04N 5/7416
USPC .......................................... 349/5
See application file for complete search history.

(56) References Cited

U.S. PATENT DOCUMENTS

| | | | |
|---|---|---|---|
| 6,176,583 B1 * | 1/2001 | Sawai | H04N 9/3105 353/20 |
| 6,412,949 B1 | 7/2002 | Halldorsson | |
| 6,648,475 B1 | 11/2003 | Roddy et al. | |
| 8,144,188 B2 | 3/2012 | Facius et al. | |
| 2003/0117595 A1 | 6/2003 | Li et al. | |
| 2006/0028620 A1 | 2/2006 | Conner | |

(Continued)

FOREIGN PATENT DOCUMENTS

| | | |
|---|---|---|
| DE | 199 24 096 A1 | 12/2000 |
| DE | 60 2004 004 581 T2 | 2/2008 |
| DE | 11 2013 000 390 T5 | 9/2014 |

*Primary Examiner* — Paul C Lee
(74) *Attorney, Agent, or Firm* — Young Basile Hanlon & MacFarlane, P.C.

(57) ABSTRACT

The invention relates to a projector (1) and to a projection optics (30) for a projector (1). In order to be able to operate the projector (1) as energy-efficiently as possible, it is provided, according to the invention, that the projector (1) comprises a beam splitter device (6, 6') having a polarization beam splitter (7, 15), wherein the polarization beam splitter (7) is arranged at an object-side end (39) of the projection optics (30).

8 Claims, 3 Drawing Sheets

(56) References Cited

U.S. PATENT DOCUMENTS

| | | | |
|---|---|---|---|
| 2008/0192152 A1* | 8/2008 | Facius | G03B 21/12 348/750 |
| 2010/0253769 A1* | 10/2010 | Coppeta | G02B 27/1026 248/346.01 |
| 2013/0188147 A1* | 7/2013 | DeCusatis | G02B 30/25 353/8 |
| 2014/0293233 A1* | 10/2014 | Shishido | G03B 21/2013 353/30 |

* cited by examiner

PROJECTOR HAVING AT LEAST FOUR PROJECTION LIGHT SOURCES AND A BEAM SPLITTER DEVICE COMPRISING A POLARIZATION BEAM SPLITTER AND PROJECTION OPTICS HAVING A BEAM SPLITTER DEVICE

CROSS REFERENCE TO RELATED APPLICATIONS

This application is a continuation of U.S. patent application Ser. No. 15/088,755, filed Apr. 1, 2016 which claims the benefit of German Patent Application No 10 2015 105 107.9 filed on Apr. 2, 2015, which is incorporated by reference as if fully set forth.

FIELD OF INVENTION

The invention relates to a projector having at least one projection light source and at least two imaging devices, wherein respectively one projection path extends from the projection light source to each of the imaging devices. Further, the invention relates to a projection optics for a projector.

BACKGROUND

Projectors and projections optics of the above-mentioned type are generally known. In order to be able to illuminate the imaging devices, known projectors comprise at least one projection light source for each imaging device. Further, the light of the projection light source has to be adapted to the demands of the respective imaging device and, for example, to be polarized. But the optical components to be used for this purpose, such as polarization filters, need construction space and cause costs. Also, about half of the light emitted by the projection light sources is lost and is not available for the illumination of the imaging devices.

Thus, the object of the invention is to provide a projector and a projection optics for a projector which can be constructed in a compact and cost-efficient manner.

SUMMARY

This object is achieved, for the above-mentioned projector, by a beam splitter device having a polarization beam splitter, wherein the beam splitter device is arranged between the polarization light source and the imaging devices along the projection path. The object is achieved for the projection optics in that the projection optics comprises a polarization beam splitter which is arranged at an object-side end of the projection optics.

By using the beam splitter device comprising the polarization beam splitter, the light emitted from the polarization light source can be distributed onto both imaging devices in a differently polarized manner. In the polarization, not only a part of the light emitted from the polarization light source is used for the illumination of the imaging devices like in commonly used polarization filters, but the light transmitted from the projection light source to the beam splitter device along the projection path can be distributed substantially completely onto both imaging devices. Thus, the projector may be constructed even more compactly because a projection light source which is weaker compared to known projectors is sufficient to illuminate the imaging devices, and thus less waste heat has to be guided out of the projector, without a decrease of the brightness of the projected image.

The solution according to the invention can be further improved by different embodiments that are each advantageous alone and can be combined with one another arbitrarily. These embodiments and the advantages associated therewith will be discussed hereinafter.

According to a first advantageous embodiment, the imaging device can be a liquid crystal on silicon (LCoS) device. These imaging devices can only be operated with polarized light. Nevertheless, the use of the beam splitter device does not require an increased construction effort and does not require the use of polarization filters, the high image quality of the LCoS-imaging device due to the construction type being maintained unchanged.

Alternatively, the imaging devices can be formed as LCDs or as micro-mirror devices, so-called DMDs.

The light emitted from the projection light source can be directed onto the imaging device to be illuminated past the polarization beam splitter, without étendue-increase.

The projector can be a stereoscopic projector.

Particularly, the projection optics is a projection optics for a projector according to the invention or of a projector according to the invention.

The polarization beam splitter splits the light emitted from the light source into two partial luminous fluxes, wherein respectively one of the partial luminous fluxes is guided to one of the imaging devices along a partial luminous flux path or a portion of the projection path, respectively. The beam splitter device can be arranged in the beam path before or after a homogenization of the luminous flux in order to uniformly illuminate the imaging device. This increases the flexibility of the structure of the projector, so that it is easier to construct the projector in a compact manner.

The beam splitter device can be introduced into the projection path between the at least one projection light source and the imaging devices before or after bringing together all color components required for the projection. Alternatively, the beam splitter device can be additionally used for the color combination.

For example, the projector can comprise at least two projection light sources, wherein the projection light sources preferably emit light with different spectrums and emit red/blue or green light, for example. Respectively one projection path can extend from the projection light sources to the beam splitter device, wherein the beam splitter device can be arranged in a crossing region of the projection paths.

The light of one of the projection light sources is polarized differently from the other one of the polarization light sources along the respective projections paths behind the beam splitter device and particularly between the beam splitter device and one of the imaging devices. Especially, the light reflected by the beam splitter device is polarized differently from the light transmitted through the beam splitter device. An optically active element which changes the polarization of the light according to its wavelength can be arranged between the polarization beam splitter and the imaging device in order for the polarization of the light of both light sources to be equal when being incident one of the imaging devices.

According to another preferred embodiment, the projector can be formed with three projection light sources which emit light of different wavelengths when in operation. The projection light sources, for example, can emit red, green or blue light, respectively. Further, the projector preferably comprises two beam splitter devices, wherein the beam splitter devices are arranged in order to be able to be illuminated by at least one of the projection light sources, respectively. The beam splitter devices can comprise a polarization beam splitter and a dichroic mirror, respectively. The dichroic mirror reflects light of selected wavelengths or wavelength ranges and allows light of other wavelengths or wavelength ranges to pass through. The dichroic mirror can be provided with a quarter-wave plate in order to permit a desired polarization of the light after being reflected at the dichroic mirror.

The light emitted from one of the light sources is split into both polarization components by the firstly illuminated polarization beam splitter. In this case, the light of one of the polarization components can be directed directly toward one of the imaging devices through the polarization beam splitter. The light of the other polarization component can be directed onto the second polarization beam splitter. It can pass through the polarization beam splitter to be incident on the dichroic mirror arranged behind the polarization beam splitter and be reflected back by it. The back-reflected light is directed toward the second imaging device through the polarization beam splitter in the second run.

The dichroic mirror of a first of the beam splitter devices can be arranged along the projection path behind the first beam splitter device, seen from a second one of the beam splitter device. This ensures that light guided from one of the polarization light sources to the second beam splitter device through the first beam splitter device and then to the dichroic mirror is guided from the dichroic mirror onto the second beam splitter device and from there to the imaging device.

In order to be able to appropriately orient the polarization of the light emitted from one of the projection light sources and guided from one of the polarization beam splitters to the other one of the polarization beam splitters, a portion of the projection path which extends from one of the beam splitter devices to the other one of the beam splitter devices can extend through an optically active element. The optically active element turns the direction of the polarization of the light according to its wavelength.

As an alternative to the dichroic mirror and the polarization beam splitter being arranged respectively behind one another along the projection path, polarizing surfaces of the polarization beam splitter and reflecting surfaces of the dichroic mirror of at least one of the beam splitter devices, and particularly of each of the beam splitter devices, can be arranged to be crossed with each other. For example, the beam splitter devices can be formed as glass cubes having four parts the surfaces of which are formed as reflecting or polarizing surfaces and which are connected to each other and, for example, cemented together. Alternatively, the beam splitter device can comprise three glass plates or even consist of them, wherein one of the glass plates is formed as a polarization beam splitter, for example. The two other ones of the glass plates can form the dichroic mirror. In this case, the one of the glass plates can be provided between the two other ones of the glass plates and arranged in such a way that the result is the crossed arrangement.

According to embodiments, a (first) projection light source is oriented in such a way that light emitted from the projection light source extends along a (first) primary projection path and is incident on a beam splitter device before reaching one of the imaging devices. Another (second) primary projection path extends between a further (second) projection light source and the beam splitter device and can be oriented in such a way that the light of the further projection light source is incident on a side of the polarization beam splitter and the light of the projection light source is incident on another side of the polarization beam splitter, and particularly on an oppositely arranged side thereof. Said primary (first and second) projection paths may cross each other in the crossing area, wherein the primary projection paths extend from the respective one of the light sources to the beam splitting device. Further, said primary projection paths may cross each other only in the crossing area. In other words, said projection paths may not cross each other (or overlap or even partially overlap with each other) in an area between the respective light source and the beam splitting device.

According to embodiments, an angle between said crossing primary projection paths may be between 50 and 130° (full circle is 360°), more preferably between 60 and 120°, more preferably between 70 and 110°, more preferably between 80 and 100°. According to embodiments, said angle between said crossing primary projection paths may be 90°.

The glass plates are plane-parallel and are, for example, formed of float glass, and thus the beam splitter device can be manufactured in a cost-efficient and easy manner.

The projector can comprise two projection optics which image one of the imaging devices, respectively, and which are provided with one of the beam splitter devices in each case.

BRIEF DESCRIPTION OF THE DRAWINGS

Hereinafter, the invention will be exemplarily explained based on exemplary embodiments with reference to the drawings. The different features of the embodiments can be combined independently from each other, as has already been explained in the individual advantageous embodiments.

Shown are.

DETAILED DESCRIPTION OF THE PREFERRED EMBODIMENTS

Firstly, the structure and the function of a projector according to the invention will be described with reference to the exemplary embodiment of FIG. 1.

Hereinafter, partial luminous flux paths or portions of the projection paths will be referred to as primary, secondary, tertiary and quaternary projections paths.

Figure 1:
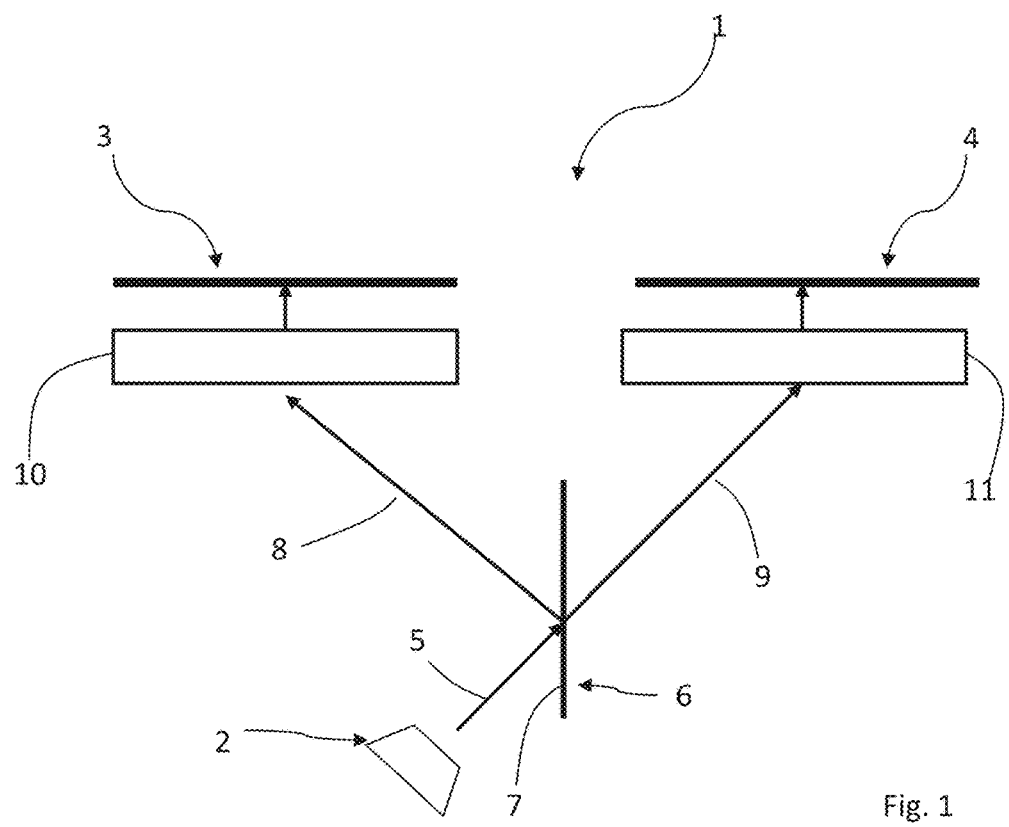
FIG. 1, a schematic view of an exemplary embodiment of a projector according to the invention.

FIG. 1 shows, in a highly schematized manner, a projector 1 having a projection light source 2 and two imaging devices 3, 4. The imaging devices 3, 4 are, for example, DMD, LDC or LCOS imaging devices. The projection light source 2 is, for example, a discharge lamp and preferably a LED. The projection light source 2 can also be a light source brought together from several individual light sources. For example, when in operation, the projection light source 2 can collectively emit light bundles of red, blue and/or green light sources, such as LEDs, which are brought together via at least one dichroic mirror.

The projection light source 2 is oriented in such a way that light emitted from the projection light source 2 extends along a primary projection path 5 and is incident on a beam splitter device 6 before reaching one of the imaging devices 3, 4. The beam splitter device 6 comprises a polarization beam splitter 7 which emits the light which is emitted from the projection light source 2 along the primary projection path 5 in a differently polarized manner. The differently polarized light propagates from the beam splitter device 6 toward the imaging devices 3, 4 along two secondary projections paths 8, 9. For example, the secondary projection path 8 extends from the beam splitter device 6 toward the imaging device 3 and the secondary projection path 9 extends toward the imaging device 4. Preferably, the light is polarized linearly by the polarization beam splitter 7, wherein the polarization direction of the light propagating along the secondary projection path 8 is oriented vertically to a polarization direction of the light propagating along the secondary projection path 9.

The light emitted from the beam splitter device 6 can be incident on an apparatus 10, 11 for orienting and/or homogenizing the luminous flux before reaching one of the imaging devices 3, 4. Particularly, the projector 1 can comprise an apparatus 10, 11 for each imaging device 3, 4 which is arranged between the polarization beam splitter 7 and one of the imaging devices 3, 4, so that a desired orientation and a maximally homogeneous distribution of the light reaching the imaging devices 3, 4 are ensured.

Additionally, the beam splitter device 6, and particularly the polarization beam splitter 7 thereof, can be arranged in the beam path before or after the homogenization of the luminous flux for the uniform illumination of the imaging devices 3, 4.

Figure 2:
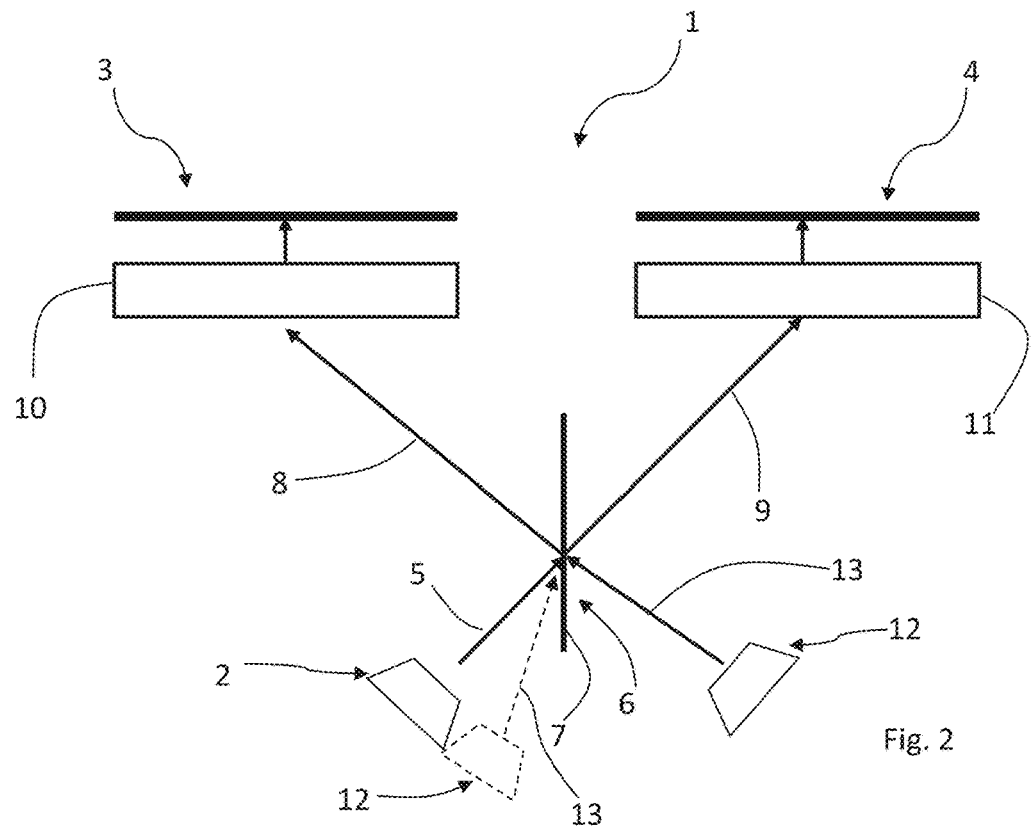
FIG. 2, a schematic view of another exemplary embodiment of the projector according to the invention.

FIG. 2 schematically shows another exemplary embodiment of the projector 1 according to the invention. Like reference numerals are used for elements the function and/or structure of which is the same as the function and/or structure of the elements of FIG. 1. For brevity's sake, hereinafter only the differences from the exemplary embodiment of FIG. 1 are illustrated.

The projector 1 of the exemplary embodiment of FIG. 2 comprises a further projection light source 12 in addition to the projection light source 2. For example, the further projection light source 12 can emit light of another wavelength range than the projection light source 2. One of the projection light sources 2, 12 can, for example, be configured to emit light of two base colors, and the other one of the projection light sources 2, 12 can be configured to emit a remaining base color. Base colors are red, green and blue, for example. Further, the projector 1 can comprise three projection light sources, wherein each of the projection light sources is configured to emit one of the base colors. When more than three base colors or additional white light are used for the projection, the projector 1 can comprise one projection light source for each base color and for the white light.

The projection light sources 2, 12 can be arranged on different sides of the beam splitter device 6. A primary projection path 13 extending between the further projection light source 12 and the beam splitter device 6 thus can be oriented in such a way that the light of the further projection light source 12 is incident on a side of the polarization beam splitter 7 and the light of the projection light source 2 is incident on another side of the polarization beam splitter 7, and particularly on an oppositely arranged side thereof.

The light emitted from the projection light sources 2, 12 is directed in a polarized manner toward the imaging devices 3, 4 along the secondary projection paths 8, 9. Alternatively, the projection light sources 2, 12 can be arranged on a side of the beam splitter device 6, so that the light emitted from both projection light sources 2, 12 is incident on the same side of the polarization beam splitter 7. Thus, the beam splitter device 6 can be introduced into the beam path of the projector 1 extending along the projection paths 5, 8, 9, 13 before or after bringing together all color components. Further, the beam splitter device 6 can also be used for the color combination.

When the projection light sources 2, 12 are arranged on different sides of the polarization beam splitter, the light emitted from the projection light source 2 extends along the secondary projection paths 8, 9 with a polarization different from that of the light emitted from the further projection light source 12. But if the light of the projection light sources 2, 12 is be guided to the imaging devices 3, 4 with the same polarization, an optically active element is to be provided between the polarization beam splitter 7 and both imaging devices 3, 4, respectively, which changes the polarization according to the wavelength and selectively turns only the polarization direction of the light of one wavelength or of one wavelength range about 90°, for example.

Figure 3:
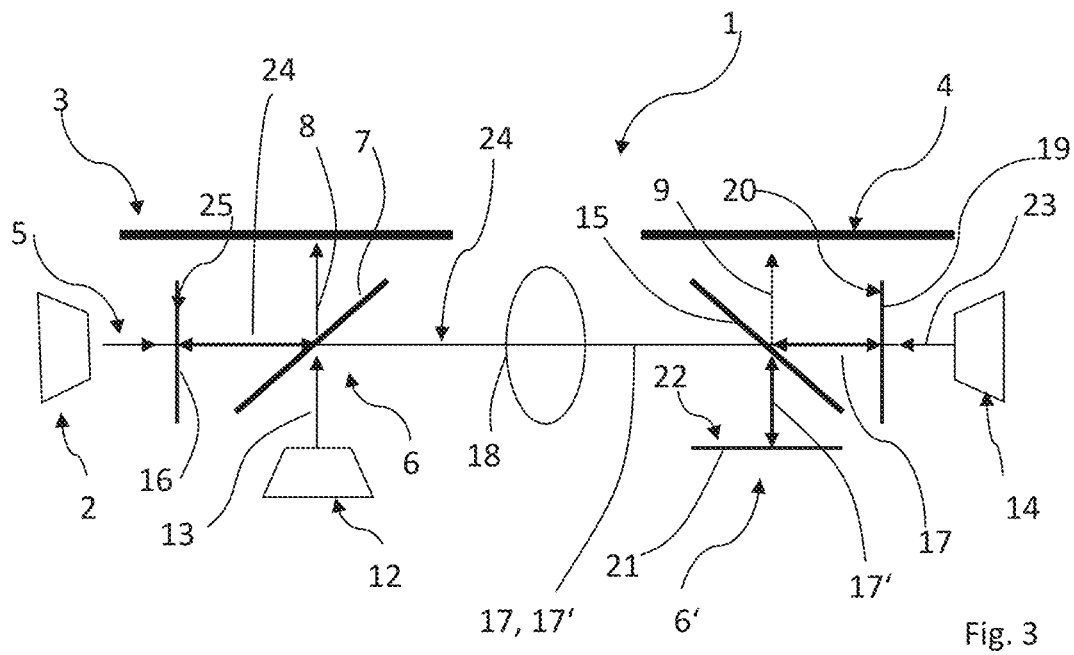
FIG. 3, a schematic view of another exemplary embodiment of the projector according to the invention.

FIG. 3 schematically shows another exemplary embodiment of the projector according to the invention. Like reference numerals are used for elements the function and/or structure of which is the same as the function and/or structure of the elements of the preceding exemplary embodiments. For brevity's sake, hereinafter only the differences from the preceding exemplary embodiments are illustrated.

FIG. 3 shows the projector 1 having both projection light sources 2, 12 as well as a third projection light source 14. Each of the projection light sources 2, 12, 14 preferably is configured to emit light of another wavelength range than the other ones of the projection light sources 2, 12, 14 when the projector 1 is in operation. The light emitted in operation from the projection light sources 2, 12 firstly is guided toward the imaging device 3 via the polarization beam splitter 7. Further, the light of the projection light sources 2, 12 is guided from the polarization beam splitter 7 to another polarization beam splitter 15 and from there to the imaging device 4. The light of the third projection light source 14 is guided from the projection beam splitter 15 onto the imaging device 4 and to the projection beam splitter 7 and from there onto the imaging device 3.

Hereinafter, the way of the light emitted in operation from the individual projection light sources 2, 12, 14 along the projection paths will be described.

The light emitted in operation from the projection light source 2 is guided toward the polarization beam splitter 7 along the primary projection path 5. On its way to the polarization beam splitter 7, the light emitted from the projection light source 2 is incident on a color-selective or dichroic mirror 16 which is arranged between the projection light source 2 and the polarization beam splitter 7 along the primary projection path 5. The dichroic mirror 16 is configured to let pass the light emitted in operation from the projection light source 2. The light emitted from the projection light source 2 is not polarized or is circularly polarized at least between the projection beam splitter 7 and the dichroic mirror 16. Particularly, the projection light sources 2, 12, 14 are configured to emit light in a non-polarized manner.

When the light emitted from the projection light source 2 along the primary projection path 5 is incident on the polarization beam splitter 7, the polarization beam splitter 7 guides a part of the light to the imaging device 3 along the secondary projection path 8. The part of the light guided to the imaging device 3 is linearly polarized in a predefined direction. Another part of the light guided to the polarization beam splitter 7 is transmitted by the polarization beam splitter 7 and guided to the polarization beam splitter 15. This part of the light is also linearly polarized, wherein its polarization direction is vertical to the polarization direction of the light reflected by the polarization beam splitter 7 toward the imaging device 3. Thus, a tertiary projection path 17 extends between the projection beam splitters 7, 15. An imaging optics 18 can be arranged along the tertiary projection path 17 for imaging the partial luminous flux guided from the polarization beam splitter 7 to the polarization beam splitter 15.

When both polarization beam splitters 7, 15 are formed with substantially identical optical characteristics, the polarization beam splitter 15 lets pass the light guided thereto along the tertiary projection path 17 without reflecting significant portions thereof. Thus, the tertiary projection path 17 extends through the polarization beam splitter 15. After the tertiary projection path 17 has passed through the projection beam splitter 15, the tertiary projection path 17 ends at another color-selective dichroic mirror 19. The dichroic mirror 19 is configured to reflect the light emitted from the projection light source 2. In order to be able to guide the light reflected by the dichroic mirror 19 onto the imaging device 4 by the polarization beam splitter 15, it may be necessary to change the polarization thereof. For example, it may be necessary to change the polarization direction of the light. For this purpose, the dichroic mirror 19 can be equipped accordingly on the side 20 thereof facing the polarization beam splitter 15. For example, the dichroic mirror 19 can be provided with a quarter-wave plate which is formed as a layer applied on the mirror 19 or as a layer stack. The light reflected by the dichroic mirror 19 passes through the quarter-wave plate two times, i.e., a first time before the reflection and another time after the reflection at the dichroic mirror 19. Thus, the quarter-wave plate acts as a half-wave plate and can turn the polarization direction of the reflected light about 90°, for example, so that the polarization beam splitter 15 can guide the light reflected by the dichroic mirror 19 substantially completely to the imaging device 4 along the secondary projection path 9.

The light guided from the further projection light source 12 to the polarization beam splitter 8 along the primary projection path 13 is split into two differently polarized partial luminous fluxes by the polarization beam splitter 7, wherein a first one of the partial luminous fluxes is guided to the imaging device 3 along the secondary projection path 8 and, for this purpose, is transmitted by the polarization beam splitter 7. The partial luminous flux of the light emitted in operation from the projection light source 12 which is reflected by the polarization beam splitter 7 is guided to the polarization beam splitter 15 along another tertiary projection path 17'.

When both projection beam splitters 7, 15 present identical optical characteristics, the projection beam splitter 15 substantially completely reflects the light reaching it along the tertiary projection path 17' toward another color-selective dichroic mirror 21. Alternatively, the dichroic mirror 21 can be a non-color-selective mirror if no light of one of the projection light sources 2, 12, 14 is to be transmitted by the mirror 21. The light reflected by the mirror 21 is transmitted to the imaging device 4 by the polarization beam splitter 15. In order for the polarization beam splitter 15 to let pass and to not reflect the light reflected by the mirror 21, the mirror 21 also comprises a quarter-wave plate at the side 22 thereof facing the polarization beam splitter 15 which is formed as a layer or as a layer stack on the mirror 21, for example. In this case, the light reflected toward the mirror 21 by the polarization beam splitter 15 passes through the quarter-wave plate two times, so that the polarization direction thereof can be turned about 90°, for example. Thus, the light reflected by the mirror 21 can readily reach the imaging device 4 through the projection beam splitter 15.

The light emitted in operation by the third projection light source 14 is firstly incident on the dichroic mirror 19 on its way to the polarization beam splitter 15 along a primary projection path 23. The dichroic mirror 19 is configured to transmit the light emitted from the projection light source 14. When the light emitted in operation from the projection light source 14 is non-polarized, the polarization of the light does not change after the passage through the mirror 19. The beam splitter 15 splits the light emitted in operation from the projection light source 14 into two partial luminous fluxes, wherein a first partial luminous flux is guided to the imaging device 4 along the secondary projection path 9. The partial luminous flux which is guided to the imaging device 4 thus is reflected by the polarization beam splitter 15. The remaining part of the light is guided to the polarization beam splitter 7 along another tertiary projection path 24. Again, an imaging optics can be arranged along the tertiary projection path 24.

If the tertiary projections paths 17, 17', 24 overlap, it may be sufficient to provide a single imaging optics 18. Alternatively, at least one of the tertiary projection paths 17, 17', 24 can extend in order to be spaced apart from at least another one of the tertiary projection paths 17, 17', 24 and can be imaged by a separately formed imaging optics.

The partial luminous flux propagating along the tertiary projection path 24 can pass through the polarization beam splitter 7 due to its polarization without being significantly reflected, when the polarization beam splitters 7, 15 are both formed with comparable optical characteristics. The tertiary projection path 24 extends through the polarization beam splitter 7 to the dichroic mirror 16 which is configured to reflect the light emitted in operation from the projection light source 14. In order to be able to guide the light reflected by the mirror 16 to the imaging device 3 and in order for it to be reflected by the projection beam splitter 7, the mirror 16 can also be configured, on the side 25 thereof facing the polarization beam splitter 7, to change the polarization of the light to be reflected by the mirror 16. Particularly, the mirror 16 can be provided with a quarter-wave plate on its side 25 which is applied as a layer or as a layer stack on the side 25, for example. The light to be reflected, in turn, passes through the quarter-wave plate two times, so that the quarter-wave plate functions as a half-wave plate and changes the polarization direction of the reflected light.

So, respectively one primary projection path 5, 13, 23 extends from the projection light sources 2, 12, 14 to the respectively nearest polarization beam splitter 7, 15. Respectively one secondary projection path 8, 9 extends from the projection beam splitters 7, 15 to one of the imaging devices 3, 4. Tertiary projection paths 17, 17', 24 extend between the polarization beam splitters 7, 15. Here, the tertiary projection paths 17, 17', 24 can extend to one of the dichroic mirrors 16, 19, 21 through the polarization beam splitter 15, 17 receiving the light from the respectively other polarization beam splitter 7, 15. Quaternary projection paths, which, for clarity's sake, are not indicated by a reference numeral, extend from the dichroic mirrors to respectively one of the polarization beam splitters 7, 15. The dichroic mirrors 16, 19, 21 and the polarization beam splitters 7, 15 can form beam splitter devices 6, 6' and be integrally operable, for example.

Figure 4:
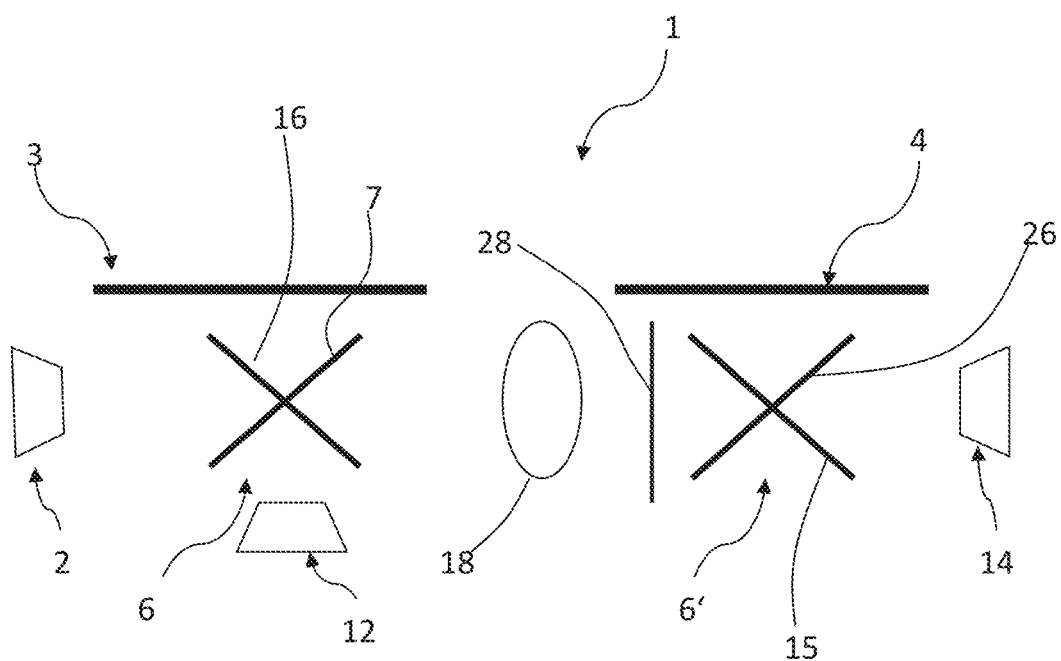
FIG. 4, a schematic view of another exemplary embodiment of the projector according to the invention.

FIG. 4 shows a schematic view of another exemplary embodiment of the projector 1 according to the invention.

Like reference numerals are used for elements the function and/or structure of which is the same as the function and/or structure of the elements of the preceding exemplary embodiments. For brevity's sake, hereinafter only the differences from the preceding exemplary embodiments are illustrated.

The projector 1 of the exemplary embodiment of FIG. 4 is substantially the same as the projector 1 of the exemplary embodiment of FIG. 3. Particularly, the projector 1 of the exemplary embodiment of FIG. 4 comprises three projection light sources 2, 12, 14 of two imaging devices 3, 4 and two beam splitter devices 6, 6'. However, the beam splitter devices 6, 6' of the exemplary embodiment of FIG. 4 are different from the beam splitter devices 6, 6' of the exemplary embodiment of FIG. 3.

The beam splitter devices 6, 6' of FIG. 4 are formed with a polarization beam splitter 7, 15 and a dichroic mirror 16, 26, respectively, wherein the polarization beam splitters 7, 15 and the dichroic mirrors 16, 26 of each of the beam splitter devices 6, 6' are arranged to be crossed with one another. For example, the polarization beam splitters 7, 15 can be formed as a continuous glass and/or plastic plate, respectively, which is equipped to divide incident light into partial luminous fluxes of different polarizations. The dichroic mirrors 16, 26 can comprise two glass and/or plastic plates, respectively, which are arranged to be aligned with one another. The polarization beam splitter 7, 15 can be arranged between the two parts of the dichroic mirror 16, 26. The plates forming the dichroic mirrors 16, 26 can be equipped and be coated, for example, to reflect or transmit light in a color-selective manner.

Alternatively, the polarization beam splitters 7, 15 and the dichroic mirrors 16, 26 can be provided on surfaces arranged within a, for example, cube-shaped beam splitter device 6, 6'. The cube-shaped beam splitter device 6, 6' can comprise four segments, for example, or even consist of them, the inner surfaces of which extend along diagonals of the cube-shaped beam splitter device 6, 6', for example. The surfaces of the segments can be alternately formed as a polarization beam splitter or as a dichroic mirror and be correspondingly coated, for example, along a circumferential direction of the beam splitter device 6, 6'.

The projection light sources 2, 12 are arranged in such a way that their light firstly is incident on the beam splitter device 6 adjacently arranged in FIG. 4. The light of the projection light source 2 is reflected from the beam splitter device 6 toward the imaging device 3 and transmitted toward the beam splitter device 6'. The light emitted in operation from the projection light source 12 firstly is incident on the beam splitter device 6 from which it is reflected toward the other beam splitter device 6' and transmitted to the imaging device 3. Thus, the light of the projection light sources 2, 12 guided to the beam splitter 6' can be polarized differently as shown in the exemplary embodiment of FIG. 3. In order for the light of both projection light sources 2, 12 to be reflected by the dichroic mirror 26 toward the imaging device 4 and to be guided at least partially through the polarization beam splitter 15 before, the projector 1 of the exemplary embodiment of FIG. 4 comprises an optically active element 28 which changes the polarization of the light in a color-selective manner. Particularly, the optically active element 28 turns the polarization direction of the light of the projection light source 12 reflected by the polarization beam splitter 7 about 90°, so that the partial luminous flux reflected by the projection beam splitter 7 of the light emitted in operation from the projection light source 12 can traverse the polarization beam splitter 15 substantially without being reflected.

The light emitted in operation from the projection light source 14 is split into two partial luminous fluxes by the polarization beam splitter 15, wherein one of the partial luminous fluxes is reflected to the imaging device 4 and the other one is transmitted to the beam splitter device 6 through the polarization beam splitter 15 and the mirror 26. The optically active element 28 can be configured to let pass the transmitted partial luminous flux of the light emitted from the projection light source 14 unchanged. Alternatively, the partial luminous flux can be guided to the beam splitter device 6 past the optically active element 28. When the polarization beam splitters 7, 15 are formed with comparable optical characteristics, the polarization beam splitter 7 allows for transmitting the light which has passed the polarization beam splitter 15, so that it is reflected onto the imaging device 3 by the dichroic mirror 16.

The dichroic mirrors 16, 26 of the exemplary embodiment of FIG. 4 can be formed without quarter-wave plates or coatings having such a function. The beam splitter device 6 can comprise the polarization beam splitter 7 and the dichroic mirror 16, and particularly consist thereof, wherein the beam splitter device 6 can be constructed in a plate-shaped or in a cube-shaped manner. The beam splitter device 6' can additionally comprise the optically active element.

Figure 5:
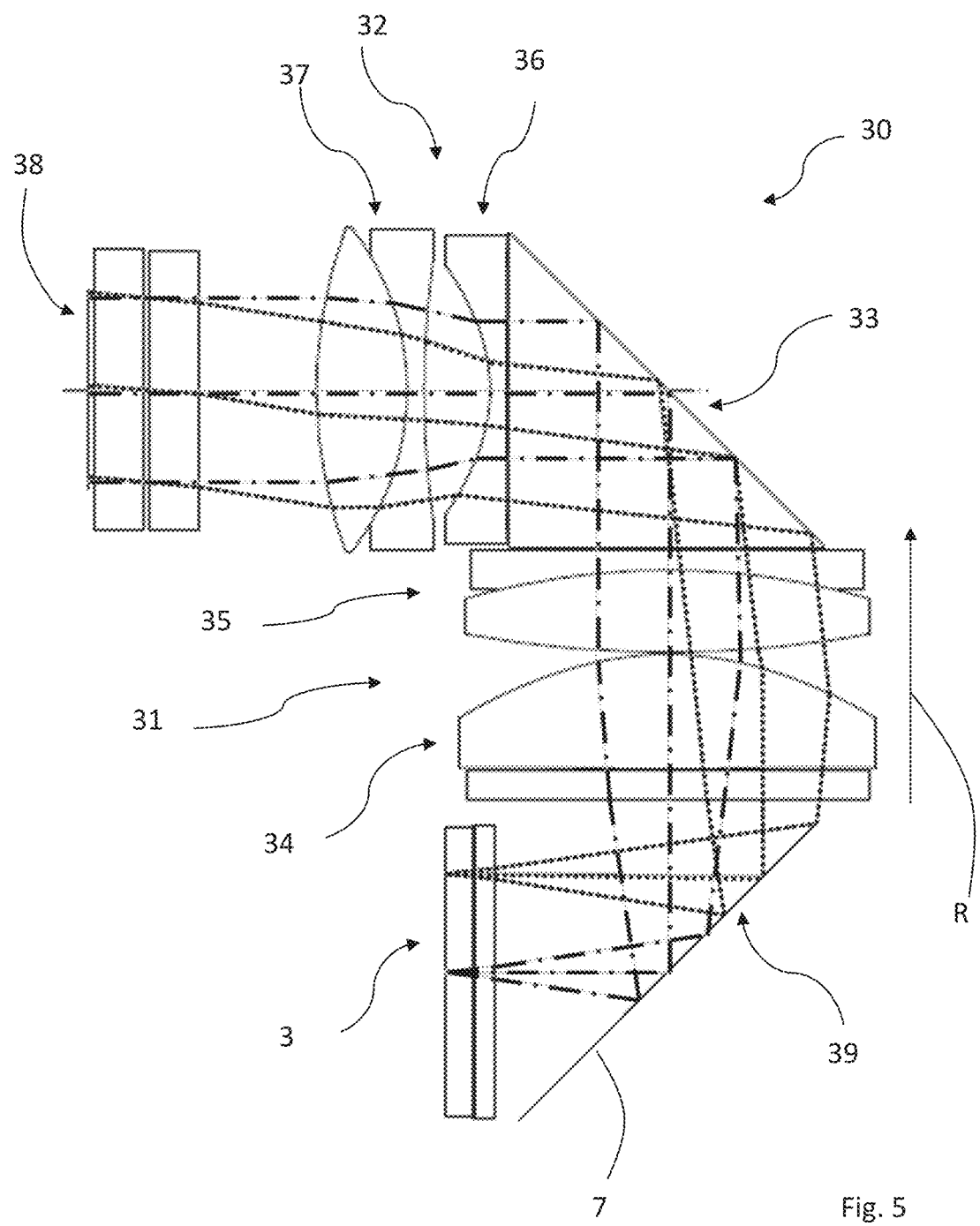
FIG. 5, a schematic sectional view of a first exemplary embodiment of a projection optics according to the invention for a projector.

FIG. 5 schematically shows a sectional view of a first exemplary embodiment of a projection optics according to the invention for a projector 1.

The projection optics 30 is illustrated with one of the imaging devices, and particularly, is exemplarily illustrated with the imaging device 3. The polarization beam splitter 7 by which the imaging device is illuminated and imaged is a part of the projection optics 30. The imaging device 3 reflects the incident light back onto the polarization beam splitter 7 which reflects the light toward a first partial optics 31 of the projection optics 30. The first partial optics 31 preferably has a positive refractive power. A second partial optics 32 of the projection optics 30 which preferably has a negative refractive power is downstream of the partial optics 31.

A bending device 33, for example, a prism or a mirror, is arranged between the two partial optics 31, 32, so that the projection optics 30 can be constructed in a space-saving manner. The bending preferably is performed along a long axis of the image field which has an aspect ratio of 2:1 or less, for example, and preferably of 16:10 or 21:9.

The first partial optics 31 comprises at least two optical component assemblies 34, 35, for example, wherein the first optical component assembly 34 is connected between the polarization beam splitter 7 and the second component assembly 35. The first optical component assembly 34 has a positive refractive power, for example. The second optical component assembly 35 includes at least one cemented member.

The second partial optics 32 also comprises at least two optical component assemblies 36, 37, wherein the first optical component assembly 36 is connected between the bending device 33 and the second optical component assembly 37. The first optical component assembly 36 preferably is formed with a negative refractive power. The second optical component assembly 37 comprises at least one cemented member.

When the bending between both partial optics 31, 32 is realized with a prism, the entry surface and the exit surface of the prism can also be provided with an optical effect and with convex or concave surfaces, for example. At least one positive lens of the first partial optics 31 can comprise aspheric surfaces. A negative lens of the second partial optics 32 can comprise aspheric surfaces. Viewed from the polarization beam splitter 7 in a projection direction R along the projected light, the light is guided onto an exit surface 38. The projected image is quasi formed in the infinite or as a virtual image at a greater distance from the projection optics 32. Since the projection optics 30 images the imaging device 3, the projection beam splitter 7 is arranged at an object-side end 39 of the projection optics 30.

The image can be guided from the exit surface 38 into at least one eye of a viewer and, for example, can be reflected into it. For this purpose, further components can be provided which direct the image of the exit surface 38 to the viewer.

The projector 1 can comprise two projection optics 30 which image one of the imaging devices 3, 4, respectively, and comprise one of the beam splitter devices 6, 6', respectively. Such a projector 1 can be a stereoscopic projector.

What is claimed is:

1. A projector having at least one projection light source and at least two imaging devices, wherein respectively one projection path extends from one projection light source, among at least one projection light source to both of the imaging devices, wherein a beam splitter device having only one polarization beam splitter is arranged along the projection path between the projection light source and the imaging devices and wherein the projector is formed with at least four projection light sources emitting light of different wavelengths, in operation, and with at least two beam splitter devices, wherein the beam splitter devices are arranged to be able to be illuminated by at least one of the projection light sources, respectively, and comprise one polarization beam splitter and at least one dichroic mirror, respectively, wherein the light reflected by the polarization beam splitter is polarized differently from the light transmitted through the polarization beam splitter.

2. The projector of claim 1, wherein the imaging devices are liquid crystal on silicon imaging devices.

3. The projector of claim 1, wherein the projector comprises at least two projection light sources from which respectively one projection path extends to one of the imaging devices in each case, wherein the beam splitter device is arranged in a crossing region of the projection paths.

4. The projector of claim 1, wherein the dichroic mirror of a first one of the beam splitter devices is arranged along the projection path behind the first beam splitter device, seen from a second one of the beam splitter device.

5. The projector of claim 4, wherein the dichroic mirror of at least one of the beam splitter devices comprises a quarter-wave plate.

6. The projector of claim 1, wherein a portion of the projection path which extends from one of the beam splitter devices to the other one of the beam splitter devices extends through an optically active element.

7. The projector of claim 1, wherein polarizing surfaces of the polarization beam splitter and reflecting surfaces of the dichroic mirror are arranged to be crossed with each other.

8. The projector of claim 1, wherein the projector comprises two projection optics which are adapted to image one of the imaging devices, respectively, wherein said two projection optics are provided with one of the beam splitter devices in each case.

* * * * *